July 7, 1925.
A. E. NORRIS
CLUTCH
Filed July 11, 1923
1,544,678
3 Sheets-Sheet 2
Fig.2.
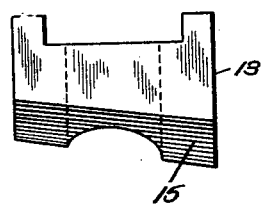
Fig.5.
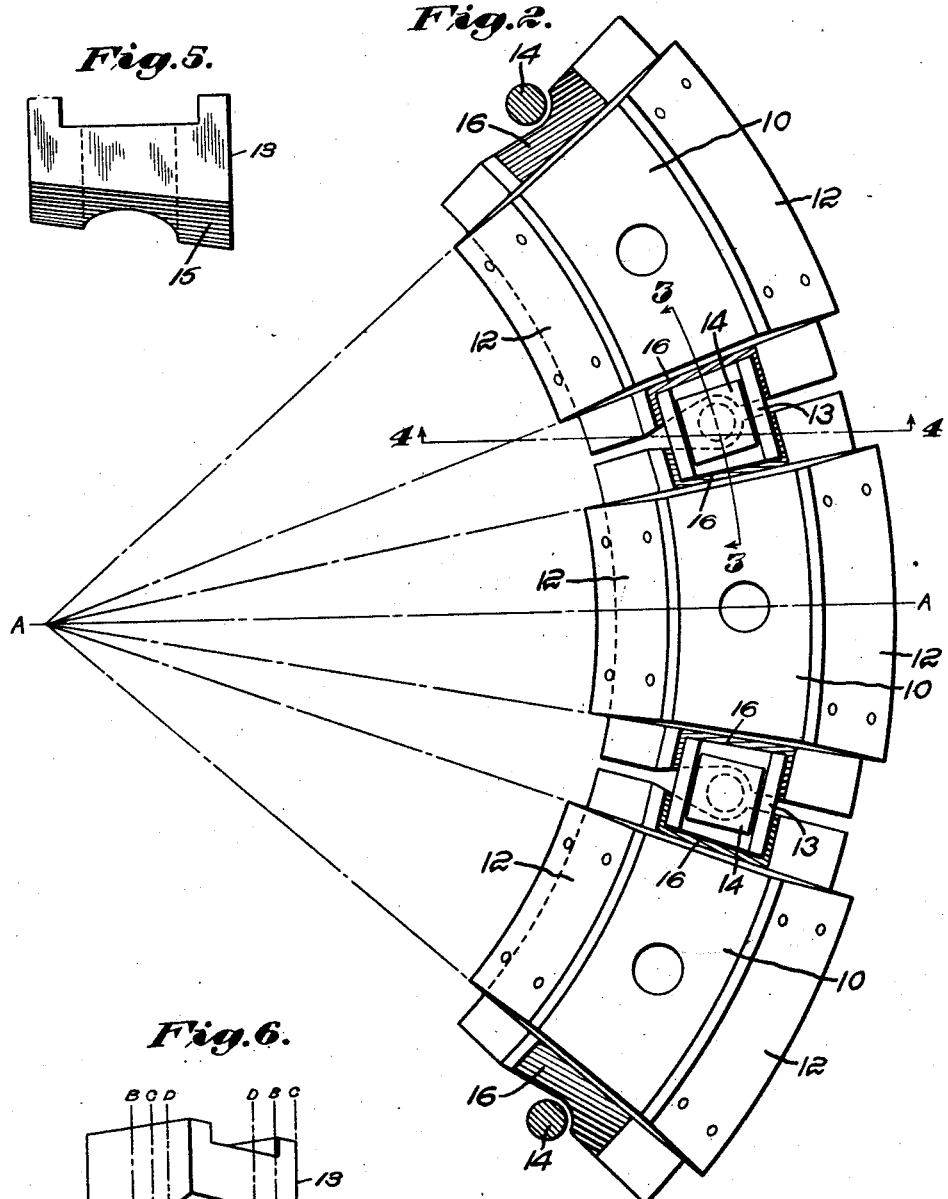
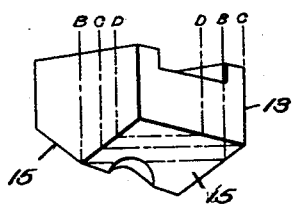
Fig.6.
Inventor:
Almon E. Norris, July 7, 1925.

A. E. NORRIS

CLUTCH

Filed July 11, 1923

Inventor:
Almon E. Norris,

Patented July 7, 1925.

1,544,678

UNITED STATES PATENT OFFICE.

ALMON E. NORRIS, OF BROOKLINE, MASSACHUSETTS.

CLUTCH.

Application filed July 11, 1923. Serial No. 650,817.

*To all whom it may concern:*

Be it known that I, ALMON E. NORRIS, a citizen of the United States, and a resident of Brookline, in the county of Norfolk and State of Massachusetts, have invented an Improvement in Clutches, of which the following description, in connection with the accompanying drawings, is a specification, like characters on the drawings representing like parts.

This invention relates to a novel and improved clutch, one member of which comprises a series of friction blocks and clamping means therefor, including a series of clamping blocks permitting each friction block to be adjusted individually in a radial direction, while snugly held against a foundation surface against which it is subsequently clamped when proper adjustment is obtained.

The invention will be best understood by reference to the following description, when taken in connection with the accompanying drawings of one specific embodiment thereof, while its scope will be more particularly pointed out in the appended claims.

In the drawings:

Fig. 2 is an end elevation on an enlarged scale showing some of the friction blocks and the clamping means therefor;

Fig. 5 is a side elevation, on an enlarged scale, of one of the clamping blocks; and Fig. 6 is a perspective view of one of the clamping blocks.

Figure 1:
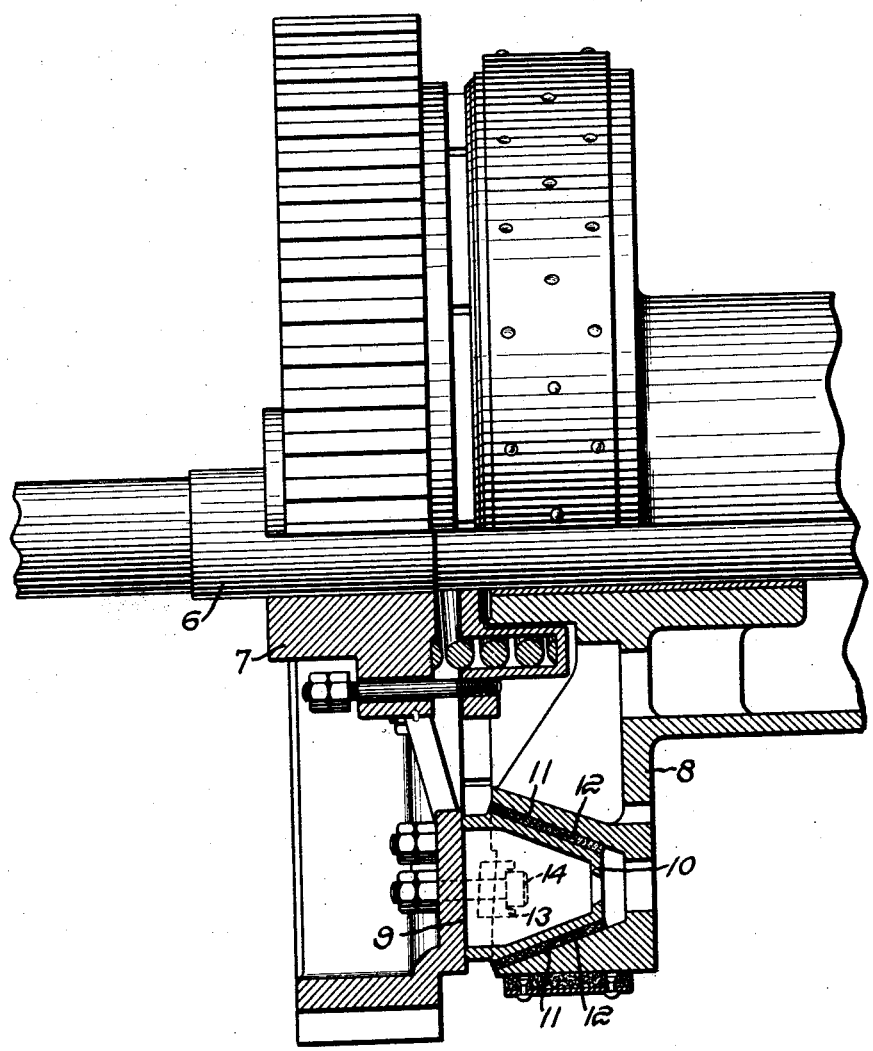
Fig. 1 is a half elevation and half section in a plane containing the axis of the clutch.

Referring to Fig. 1 of the drawings, and to the embodiment of the invention which is selected for exemplification, there is shown a clutch comprising a shaft 6 on which two clutch members 7 and 8 are mounted for relative axial movement. Herein, the clutch member 7 is secured to the shaft, while the clutch member 8 is loosely mounted thereon. The clutch member 7 presents a foundation surface 9, which is normal to the axis of the clutch members, and affords support for a series of friction blocks 10, which are disposed about the axis and have flat faces which rest against said surface.

The friction blocks have working surfaces 11 transverse to the surface 9, adapted for cooperation with corresponding circumferential surfaces of the clutch member 8. In the present embodiment, there are two sets of these working surfaces, an inner set and an outer set, and the surfaces are frustoconical, so that the blocks have a wedging action when forced into engagement with the cooperating clutch member. Each friction block is preferably formed of metal, and is provided on each working surface with a facing 12 with appropriate material, such as any one of the commonly employed compositions containing asbestos used for lining clutches and brakes.

Figure 3:
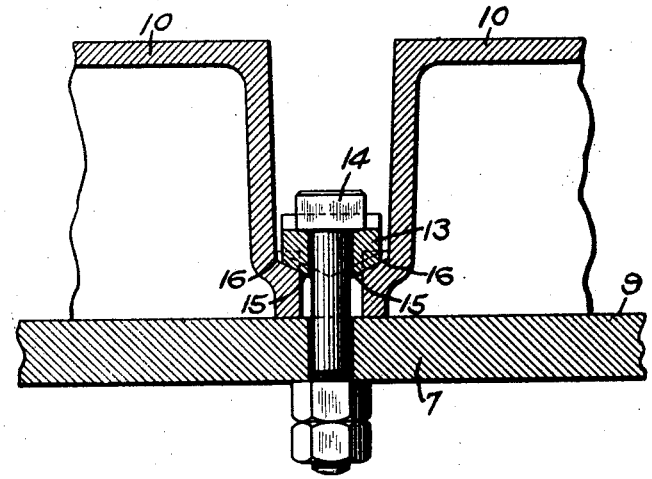
Fig. 3 is a sectional view on line 3—3 of Fig. 2.

The means for clamping the friction blocks will now be described, reference being had at first to Fig. 3. The blocks are spaced apart a sufficient distance to accommodate between them clamping means including clamping blocks 13 and bolts 14, the latter extending through the former and through the clutch member 7 to which they secure the friction blocks. As shown in Fig. 6, each clamping block is of wedge-like character in cross-section, it being provided with two surfaces 15, which are oblique to the foundation surface 9 against which the friction blocks are clamped, the friction blocks being provided with corresponding oblique surfaces 16 on which the clamping blocks are seated. It follows that each clamp, when tightened, tends to spread the ends of the adjacent friction blocks apart, and in this way the blocks are properly spaced while the very powerful clamping action is obtained.

Figure 4:
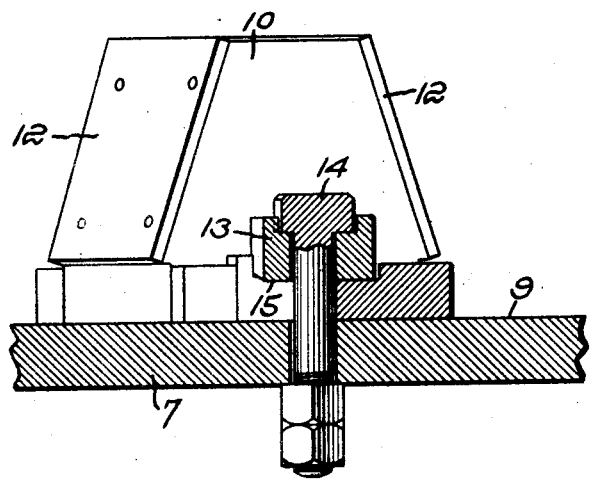
Fig. 4 is a sectional view on line 4—4 of Fig. 2.

Provision is made to enable each friction block to be adjusted individually in a radial direction while held snugly against the foundation surface 9, thereby to ensure proper engagement of each block with the working surfaces of the other clutch member. This is conveniently accomplished in the present example by so arranging the oblique surfaces 15 and 16 that all planes intersecting said surfaces (as for example the planes BB, CC and DD, in Fig. 6) parallel with the radial plane A—A, Fig. 2, containing the clutch axis, intersect said surfaces along lines which are normal to the clutch axis,—that is to say, they are parallel with the foundation surface 9, (see also Fig. 4). Thus each clamping block, while possessing the advantages arising from its wedge-like characteristic, permits perfect freedom of adjustment of each friction block along a radial line, such as the line A—A, by simply loosening the clamping bolts of such block very slightly. It should be understood, of course, that ample clearances are provided about the clamping bolts (see Fig. 2) to permit these adjustments.

In assembling the clutch, the friction blocks and their clamping means are first assembled on the foundation surface 9, and the other clutch member is brought into full engagement therewith, during which time the friction blocks are adjusted radially inward or outward, as the case may be, to obtain a full bearing of the working surfaces of the friction blocks with the working surfaces of the other clutch member. The clamping bolts are then tightened, and the clutch is ready for use.

Having thus described one embodiment of the invention, but without limiting myself thereto, what I claim and desire by Letters Patent to secure is:

1. In a clutch, the combination of two coaxial clutch members, one presenting endwise a surface normal to the axis of said members; a series of friction blocks disposed about said axis and having faces resting against said surface, and working surfaces transverse to said surface, the other clutch member having a circumferential working surface, and means for holding said blocks against the first-mentioned surface, and permitting each block to be adjusted individually in either direction along a radial line to bring its working surface into proper working contact with said circumferential working surface while such block is snugly held against the first-mentioned surface and without increasing or decreasing the pressure against the first-mentioned surface.

2. In a clutch, the combination of two coaxial clutch members, one presenting endwise a foundation surface normal to the axis of said members, a series of friction blocks disposed about said axis and having faces resting against said foundation surface and working surfaces transverse to said foundation surface, the other clutch member having a circumferential working surface, and clamping means including clamping blocks for holding said friction blocks against said foundation surface, said clamping blocks and said friction blocks having abutting wedging surfaces tending to wedge said friction blocks apart, and having provision to permit each friction block to be adjusted individually in either direction along a radial line to bring its working surface into proper working contact with said circumferential working surface while such block is snugly held against the first-mentioned surface and without increasing or decreasing the pressure against the first-mentioned surface.

3. In a clutch, the combination of two coaxial clutch members, one presenting endwise a foundation surface normal to the axis of said members, a series of friction blocks disposed about said axis and having faces resting against said foundation surface and working surfaces transverse to said foundation surface, the other clutch member having a circumferential working surface, and clamping means including a series of clamping blocks interposed between said friction blocks and holding said friction blocks against said foundation surface, said clamping blocks and said friction blocks having abutting surfaces oblique to said foundation surface and arranged to permit each friction block to be adjusted individually to bring its working surface into proper working contact with said circumferential working surface while such block is snugly held against the first-mentioned surface and without increasing or decreasing the pressure against the first-mentioned surface.

4. In a clutch, the combination of two coaxial clutch members, one presenting endwise a foundation surface normal to the axis of said members, a series of friction blocks disposed about said axis and having faces resting against said foundation surface and working surfaces transverse to said foundation surface, the other clutch member having a circumferential working surface, and clamping means including a series of clamping blocks interposed between said friction blocks and holding said friction blocks against said foundation surface, said clamping blocks and said friction blocks having abutting surfaces oblique to said foundation surface, said abutting surfaces being so disposed with respect to a given friction block that planes parallel with the radial, median line of such block intersect said abutting surfaces along lines normal to the clutch axis.

5. In a clutch, the combination of two coaxial clutch members, one presenting endwise a foundation surface normal to the axis of said members, a series of friction blocks disposed about said axis and having faces resting against said foundation surface and working surfaces transverse to said foundation surface, the other clutch member having a circumferential working surface, and clamping means including a series of clamping blocks interposed between said friction blocks and holding said friction blocks against said foundation, said clamping blocks and said friction blocks having abutting surfaces oblique to said foundation surface in two directions, said abutting surfaces being so disposed with respect to a given friction block that planes parallel with a radial plane containing the clutch axis intersect said abutting surfaces along lines normal to the clutch axis.

6. In a clutch, the combination of two coaxial clutch members, one presenting endwise a foundation surface normal to the axis of said members, a series of friction blocks disposed about said axis and having faces resting against said foundation surface and working surfaces transverse to said foundation surface, the other clutch member having a circumferential working surface, and clamping means including a series of clamping blocks holding said friction blocks against said foundation surface, said clamping blocks and said friction blocks having abutting surfaces so disposed that planes parallel with the radial, median line of each block intersect said abutting surfaces along lines parallel with said foundation surface.

In testimony whereof, I have signed my name to this specification.

ALMON E. NORRIS.